United States Patent [19]
Lockshaw et al.

[11] Patent Number: 5,508,085
[45] Date of Patent: * Apr. 16, 1996

[54] STRUCTURAL ELEMENTS MADE WITH CORES OF FIBER-REINFORCED PLASTIC

[75] Inventors: James J. Lockshaw, Huntington Beach; Stephen Kelly, Yorba Linda; Randall Walker, Santa Ana; Jr., John Kaiser, Huntington Beach, all of Calif.

[73] Assignee: Tolo, Inc., Irvine, Calif.

[*] Notice: The portion of the term of this patent subsequent to Dec. 28, 2010, has been disclaimed.

[21] Appl. No.: 173,613

[22] Filed: Dec. 27, 1993

Related U.S. Application Data

[63] Continuation-in-part of Ser. No. 771,009, Oct. 3, 1991, Pat. No. 5,273,806.

[51] Int. Cl.$^6$ ....................................................... B32B 1/00
[52] U.S. Cl. ........................... 428/178; 428/113; 428/114; 428/120; 428/167; 428/232; 428/236; 428/289; 428/294; 428/295; 52/793.1; 156/166; 264/257
[58] Field of Search ................................ 428/167, 53, 120, 428/166, 172, 178, 99, 101, 113, 114, 105, 232, 236, 289, 294, 295; 52/806, 593, 785, 284, 273; 156/161, 166, 296; 264/257, 248

[56] References Cited

U.S. PATENT DOCUMENTS

| | | | |
|---|---|---|---|
| 4,304,821 | 12/1981 | Hayase et al. | 428/593 |
| 4,957,788 | 9/1990 | Colonel | 428/33 |
| 5,273,806 | 12/1993 | Lockshaw et al. | 428/167 |

*Primary Examiner*—Donald J. Loney
*Attorney, Agent, or Firm*—Louis J. Bachand

[57] ABSTRACT

A structural element core adapted to space apart opposed first and second, laterally and longitudinally extended, generally planar surface structures, the core comprising a closed figure pattern of ribbing defined by a plurality of periodically intersecting laterally or longitudinally disposed and vertically stacked fibers and a fiber supporting plastic matrix, the fibers and matrix being radially deflected at their locus of intersection with oppositely disposed fibers and matrix sufficiently to be vertically stacked to the same height at their locus of intersection as between. comprising opposed first and second. The core is usefully combined with one or more planar surface structures to form a structural element e.g., an aircraft panel.

32 Claims, 1 Drawing Sheet

STRUCTURAL ELEMENTS MADE WITH CORES OF FIBER-REINFORCED PLASTIC

REFERENCE TO RELATED APPLICATION

This application is a continuation in part of U.S. patent application Ser. No. 07/771,009, filed Oct. 3, 1991, now U.S. Pat. No. 5,273,806.

FIELD OF THE INVENTION

This invention relates to structural elements, ranging from aircraft components to enclosures, which are lightweight, extremely strong, widely variable in size, configuration and material of construction, easy to manufacture with widely available equipment, and free of the problems associated with other forms of structural elements serving some of the same purposes, such as honeycomb panels.

The invention further relates to structural elements having three structures, including first and second surface structures and a third structure interposed between the surface structures, the structures being joined together by interlocking ribbing formed on the surface and third structures, the ribbing forming a closed figure.

The invention still further relates fiber reinforced plastic cores, for structural elements, and for other uses such as structural uses where strength, rigidity, reduced weight, lower manufacturing costs, and freedom from corrosion considerations are important, including aircraft panels, flooring sections, and bridge elements. The present cores comprise intersecting fiber reinforcement bonded in a plastic matrix in a manner to afford planar surfaces in the completed structure despite the successive crossing and overlap of the component fiber reinforcement.

BACKGROUND

Aircraft components including engine intake ducts, flooring and wing sections are frequently made of honeycomb material which is lightweight, rigid and capable of being fabricated in many shapes. Honeycomb is, however, expensive, difficult to work with, problematic when contour changes are required, awkward to attach other parts to, and not readily repairable. These drawbacks to honeycomb structural elements have been met by reinforcing the element where other parts are to be mounted, by adding brackets at junctions of internal members and, in general, beefing up the structural element, all at the cost of increasing its weight, thus lessening the most significant putative advantage of the honeycomb.

SUMMARY OF THE INVENTION

It is an object, therefore, of the present invention to provide a structural element which affords the advantages of honeycomb but avoids the disadvantages. It is another object to provide a structural element which is widely variable is size and contour with no great change in manufacturing complexity or cost, which is lightweight while offering great strength, which is readily repaired, and which affords easy attachment of other components with no special post manufacturing steps. It is another object to provide a fiber reinforced plastic cores between upper and lower planar sheets of metal, plastic, composite or other sheet material, the cores being planar surfaced themselves for ease of assembly with planar sheet material, and the presentation of a perfectly flat surface on the final product.

These and other objects of the invention, to become apparent hereinafter, are realized in a structural element comprising opposed first and second, laterally and longitudinally extended, generally planar surface structures and interposed therebetween a fiber reinforced core comprising a closed figure pattern of ribbing defined by a plurality of periodically intersecting laterally or longitudinally disposed and vertically stacked fibers and a fiber supporting plastic matrix, the fibers and matrix being radially deflected at their locus of intersection with oppositely disposed fibers and matrix sufficiently to be vertically stacked to the same height at their locus of intersection as between, whereby the core registers in plane relation with the planar surface structures.

In this and like embodiments, typically: the core is bonded to at least one of the planar surface structures; the core is bonded to each of the first and second planar surface structures; and/or the core is separately formed from the planar surface structures.

In another embodiment, the invention provides a structural element core adapted to space apart opposed first and second, laterally and longitudinally extended, generally planar surface structures, the core comprising a closed figure pattern of ribbing defined by a plurality of periodically intersecting laterally or longitudinally disposed and vertically stacked fibers and a fiber supporting plastic matrix, the fibers and matrix being radially deflected at their locus of intersection with oppositely disposed fibers and matrix sufficiently to be vertically stacked to the same height at their locus of intersection as between.

In this and like embodiments, typically, the fiber comprises a mineral fiber; the mineral fiber comprises glass, metal or carbon; the laterally and longitudinally disposed fibers extend uninterruptedly substantially across the lateral and longitudinal extent of the core, respectively; the fibers comprise bundles of filaments; the matrix plastic comprises a thermosetting plastic; the thermosetting plastic comprises one or more of epoxy, urethane, unsaturated polyester, acrylic, silicone, phenolic, polyimide, and bis-maleimide polymers; the plastic is present in an amount sufficient to bind the fibers in rigid, self-supporting relation; and/or the plastic is present in an amount between 5 and 75 weight per cent based on the total weight of fiber and plastic.

In a particularly preferred embodiment, the laterally and longitudinally disposed fibers extend uninterruptedly substantially across the lateral and longitudinal extent of the core, respectively, the fibers comprise bundles of filaments, the matrix plastic comprises a thermosetting plastic, the thermosetting plastic comprises one or more of epoxy, urethane, unsaturated polyester, acrylic, silicone, phenolic, polyimide, and bis-maleimide polymers, and the plastic is present in an amount sufficient to bind the fibers in rigid, self-supporting relation, e.g. in an amount between 5 and 75 weight per cent based on the total weight of fiber and plastic.

The invention further contemplates such structural element core in combination with a planar surface structure, and in combination with upper and lower planar surface structures lying parallel to the lateral and longitudinal planes of the core in bonded relation.

The invention further contemplates the method of forming a structural element core including the steps of laying a first succession of fibers carrying a bondable plastic matrix in a first direction. laying a second succession of fibers carrying a polymer matrix in a second direction transverse to the first direction in a manner such that the first and second successions of fibers are interleaved and their respective polymers in contact, locally deflecting said first and second fibers at their locus of intersection to reduce the height of the two fibers to about the height of one fiber undeflected, replicating these steps in a laterally and longitudinally extended pattern to form a core having a planar surface including across the locus of fiber intersection, and bonding said fibers in their assembled relation with the polymers.

BRIEF DESCRIPTION OF THE DRAWINGS

The invention will be further described in conjunction with the accompanying drawing wherein.

DETAILED DESCRIPTION

The term "a closed figure pattern of ribbing" herein refers to a series of laterally and/or longitudinally adjacent closed figures of ribbing forming a pattern. A "closed figure" of ribbing is one in which a straight line drawn anywhere through the figure will intersect ribbing in at least two places, and includes a circle, triangle and rectangle in which adjacent segments of ribbing are contiguous, as well as circular and rectangular spirals and other figures wherein although the ribbing segments are arranged about a common point and adjacent segments are not always contiguous, a straight line drawn anywhere through the figure will intersect ribbing in at least two places.

Figure 1:
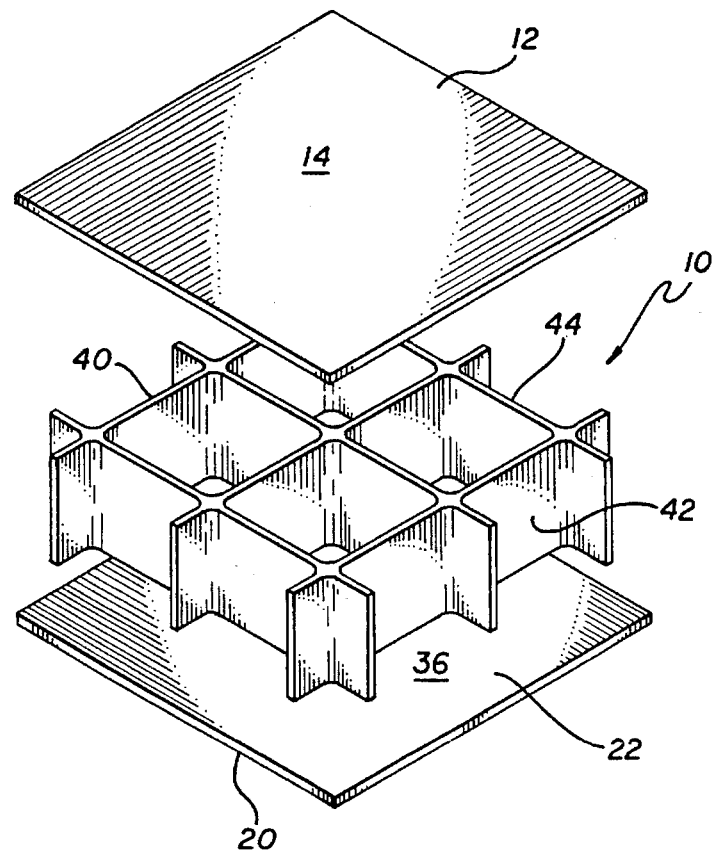
FIG. 1 is an axonometric view of a structural element according to the invention shown exploded.
Figure 3:
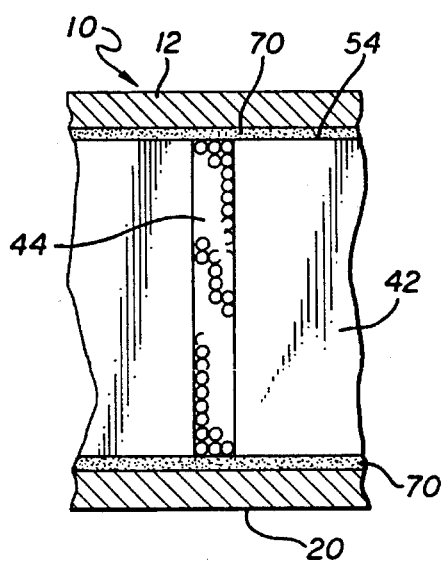
Figure 2:
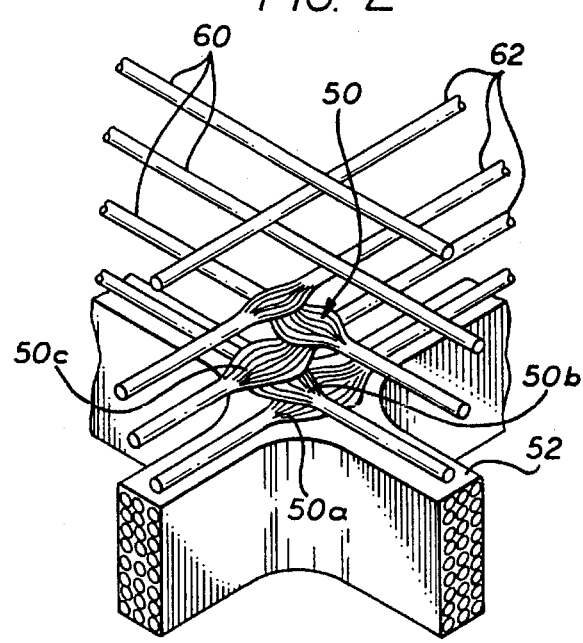
FIG. 2 is a view in vertical section of the invention structural element assembled; and, FIG. 3 is a fragmentary axonometric view of the structural element core in progressive formation.

With reference to the drawings, in FIGS. 1, 2 and 3 a structural element 10 is shown comprising a first or upper surface structure 12 comprising a generally planar surface portion 14 and a second or lower surface structure 20 comprising a generally planar surface portion 22.

Structural element core 40 comprises a closed figure of lateral and longitudinal ribbing 42, 44 respectively. The ribbing 42, 44 is located, sized and shaped to register in plane with the upper and lower planar surface structures 12, 20, as shown. Core 40 bridges the distance by which the surface portions 14 and 22 are spaced, and effects the spacing.

The separation of surface structures 12, 20, may be varied by changing the height of the core 40 ribbing 42, 44 to provide a tapered or stepped structural element. Desirably in manufacturing, the planar surface structures, which can be metal or composite material, are formed e.g. by machining or otherwise to leave relatively more material at certain locations e.g. at the locus of intersection of the ribs 42, 44 to provide increased compressive strength. Also the interior surface 36 of the surface structure 20 can be machined out to reduce material and thus weight and at the same time add rigidity because of the resulting raised rib which will result. The interconnection of the first and second surface structures 12, 20 with the core 40 is preferably by a adhesive bonding with plastic polymers such as those used to form the core as hereinafter described.

The structural element core 40 is typically formed by laying fiber 60 carrying a bondable plastic in a first, e.g the longitudinal, direction, suitably confined in a mold (not shown) to achieve a vertical build-up, laying additional fiber 62 also carrying bondable plastic in a second, e.g. the lateral or transverse direction, alternating the longitudinal and lateral fibers so that they intersect at longitudinally and laterally spaced locations, At the locus of intersection 50, each successive fiber layer 50a, 50b, 50c, etc. is pressed down against its predecessor in the stack mashing the fiber strands and the enveloping plastic such that the fiber is deflected radially. In this manner, the build-up of fiber/plastic at the intersections 50 is kept to the height of the fiber/plastic build-up between intersections, e.g. at 52. The result is a core 40 which has a planar surface 54 at its vertical top and bottom. The core 40 thus enables a structural element to be fabricated with planar upper and lower surface structures despite the core being a composite of fiber and plastic laid in an intersecting pattern.

Structural element 10 can be fabricated into a wide variety of products, ranging from wings to walls, platforms to frameworks.

Core 40 is preferably formed of fiber reinforced plastic, e.g. a mineral fiber such as metal, glass or carbon and like fibers suitably formed of a plurality of strands or filaments for ease of flattening at each locus of intersection. The plastic is any bondable plastic which will support the fibers in their laid-up disposition, especially thermosetting plastics such as epoxy, urethane, polyester, acrylic, silicone, phenolic, polyimide, bis-maleimide, polyolefin or styrene or olefin copolymer resins among other resins and shaped with fiber into core 40 structures, advantageously with flattening of the fiber/plastic composite at the nodes of the core so as to maintain a planar effect in the upper and lower surface structures, as shown in FIG. 3. The planar surface structures 12, 20 are suitably bonded to the core 40 at 70 with one or more plastics such as just recited.

As will be evident from the foregoing, planar surfaced materials used can include metals such as aluminum and titanium or other metals, and composites of fibers, fillers and resins which have suitable strength and machining characteristics.

We claim:

1. Structural element comprising opposed first and second, laterally and longitudinally extended, generally planar surface structures and interposed therebetween a fiber reinforced core comprising a closed figure pattern of ribbing defined by a plurality of periodically intersecting laterally or longitudinally disposed and vertically stacked fibers and a fiber supporting plastic matrix, said fibers and matrix being radially deflected at their locus of intersection with oppositely disposed fibers and matrix sufficiently to be vertically stacked to the same height at their locus of intersection as between, whereby said core registers in plane relation with said planar surface structures.

2. Structural element according to claim 1, in which said core is bonded to at least one of said planar surface structures.

3. Structural element according to claim 1, in which said core is bonded to each of said first and second planar surface structures.

4. Structural element according to claim 1, in which said core is separately formed from said planar surface structures.

5. Structural element core adapted to space apart opposed first and second, laterally and longitudinally extended, generally planar surface structures, said core comprising a closed figure pattern of ribbing defined by a plurality of periodically intersecting laterally or longitudinally disposed and vertically stacked fibers and a fiber supporting plastic matrix, said fibers and matrix being radially deflected at their locus of intersection with oppositely disposed fibers and matrix sufficiently to be vertically stacked to the same height at their locus of intersection as between.

6. Structural element core according to claim 5, in which said fiber comprises a mineral fiber.

7. Structural element core according to claim 6, in which said mineral fiber comprises glass, metal or carbon.

8. Structural element core according to claim 5, in which said laterally and longitudinally disposed fibers extend uninterruptedly substantially across the lateral and longitudinal extents of said core, respectively.

9. Structural element core according to claim 5, in which said fibers comprise bundles of filaments.

10. Structural element core according to claim 5, in which said plastic matrix comprises a thermosetting plastic.

11. Structural element core according to claim 10, in which said thermosetting plastic comprises one or more of epoxy, urethane, unsaturated polyester, acrylic, silicone, phenolic, polyimide, and bis-maleimide polymers.

12. Structural element core according to claim 5, in which said plastic is present in an amount sufficient to bind said fibers in rigid, self-supporting relation.

13. Structural element core according to claim 9, in which said plastic is present in an amount between 5 and 75 weight per cent based on the total weight of fiber and plastic.

14. Structural element core according to claim 7, in which said laterally and longitudinally disposed fibers extend uninterruptedly substantially across the lateral and longitudinal extents of said core, respectively.

15. Structural element core according to claim 14, in which said fibers comprise bundles of filaments.

16. Structural element core according to claim 15, in which said matrix plastic comprises a thermosetting plastic.

17. Structural element core according to claim 16, in which said thermosetting plastic comprises one or more of epoxy, urethane, unsaturated polyester, acrylic, silicone, phenolic, polyimide, and bis-maleimide polymers.

18. Structural element core according to claim 17, in which said plastic is present in an amount sufficient to bind said fibers in rigid, self-supporting relation.

19. Structural element core according to claim 18, in which said plastic is present in an amount between 5 and 75 weight per cent based on the total weight of fiber and plastic.

20. Structural element core according to claim 5, in combination with a planar surface structure.

21. The method of forming a structural element core including the steps of laying a first succession of fibers carrying a bondable plastic matrix in a first direction, laying a second succession of fibers carrying a bondable plastic matrix in a second direction transverse to said first direction in a manner such that said first and second successions of fibers are interleaved and their respective polymers in contact, locally deflecting said first and second successions of fibers at their locus of intersection to reduce the height of the two successions of fibers to about the height the first or second succession of fibers, and replicating these steps in a laterally and longitudinally extended pattern to form a core having a planar surface including across the locus of fiber intersection, and bonding said fibers in their assembled relation with said bondable plastic matrix.

22. Structural element comprising first and second, laterally and longitudinally extended surface structures and interposed therebetween a fiber reinforced core comprising a closed figure pattern of ribbing defined by a plurality of periodically intersecting laterally or longitudinally disposed and vertically stacked fibers and a fiber supporting plastic matrix, said fibers being deflected at their locus of intersection with intersecting fibers sufficiently to reduce the height of said stacked fibers at their locus of intersection.

23. Structural element according to claim 22, in which said core is bonded to at least one of said surface structures.

24. Structural element according to claim 22, in which said core is bonded to each of said first and second surface structures.

25. Structural element according to claim 22, in which said core is separately formed from said surface structures.

26. Structural element core adapted to space apart opposed first and second, laterally and longitudinally extended surface structures, said core comprising a closed figure pattern of ribbing defined by a plurality of periodically intersecting laterally or longitudinally disposed and vertically stacked fibers and a fiber supporting plastic matrix.

27. Structural element core according to claim 26, in combination with upper and lower surface structures in bonded relation.

28. Structural element core according to claim 26, in combination with upper and lower surface structures in bonded relation.

29. Structural element comprising opposed first and second, laterally and longitudinally extended surface structures and interposed therebetween a fiber reinforced core comprising a closed figure pattern of ribbing defined by a plurality of periodically intersecting laterally or longitudinally disposed and vertically stacked fibers and a fiber supporting plastic matrix.

30. Structural element according to claim 29, in which said core is bonded to at least one of said surface structures.

31. Structural element according to claim 29, in which said core is bonded to each of said first and second surface structures.

32. Structural element according to claim 29, in which said core is separately formed from said surface structures.

* * * * *